United States Patent
Rose et al.

(10) Patent No.: US 10,370,877 B2
(45) Date of Patent: Aug. 6, 2019

(54) DESTINATION CRITERIA FOR UNLOCKING A VEHICLE DOOR

(71) Applicant: LENOVO (Singapore) PTE. LTD., New Tech Park (SG)

(72) Inventors: Amy Leigh Rose, Chapel Hill, NC (US); John Scott Crowe, Durham, NC (US); Gary David Cudak, Wake Forest, NC (US); Jennifer Lee-Baron, Morrisville, NC (US); Nathan J. Peterson, Oxford, NC (US); Bryan Lloyd Young, Tualatin, OR (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 15/273,399

(22) Filed: Sep. 22, 2016

(65) Prior Publication Data
US 2018/0080263 A1   Mar. 22, 2018

(51) Int. Cl.
| | |
|---|---|
| *E05B 81/56* | (2014.01) |
| *E05B 81/18* | (2014.01) |
| *E05B 81/64* | (2014.01) |
| *B60R 25/20* | (2013.01) |
| *B60R 25/25* | (2013.01) |

(52) U.S. Cl.
CPC ............. *E05B 81/56* (2013.01); *B60R 25/20* (2013.01); *B60R 25/25* (2013.01); *E05B 81/18* (2013.01); *E05B 81/64* (2013.01); *E05Y 2900/531* (2013.01)

(58) Field of Classification Search
CPC .......... E05B 81/56; E05B 81/18; E05B 81/64; B60R 25/25; B60R 25/20; E05Y 2900/531

USPC .......................................................... 701/36
See application file for complete search history.

(56) References Cited

U.S. PATENT DOCUMENTS

| | | |
|---|---|---|
| 4,982,072 A | 1/1991 | Takigami |
| 7,327,242 B2 | 2/2008 | Holloway et al. |
| 7,956,730 B2 | 6/2011 | White et al. |
| 8,660,734 B2 | 2/2014 | Zhu et al. |
| 8,688,306 B1 | 4/2014 | Nemec et al. |
| 9,139,091 B1 | 9/2015 | Penilla et al. |
| 9,194,168 B1 | 11/2015 | Lu et al. |
| 9,196,143 B2 | 11/2015 | Lin |
| 9,229,905 B1 | 1/2016 | Penilla et al. |
| 9,599,477 B1 | 3/2017 | Aula et al. |
| 9,631,933 B1 | 4/2017 | Aula et al. |

(Continued)

OTHER PUBLICATIONS

USPTO, U.S. Appl. No. 15/243,329, Office Action Summary, dated Nov. 1, 2017.

*Primary Examiner* — Muhammad Shafi
(74) *Attorney, Agent, or Firm* — Kunzler Bean & Adamson (57) ABSTRACT

For controlling vehicle egress, an apparatus is disclosed. A system, method, and program product also perform the functions of the apparatus. The apparatus includes a vehicle, a processor, a memory that stores code executable by the processor. The processor determines whether a supervised passenger is in the vehicle, locks a vehicle door in response to a supervised passenger being in the vehicle, and unlocks the vehicle door in response to the vehicle satisfying one or more predetermined destination criteria. The one or more predetermined destination criteria may include reaching a predetermined location and/or detecting a guardian of the supervised passenger in proximity to the vehicle.

20 Claims, 5 Drawing Sheets

(56) References Cited

U.S. PATENT DOCUMENTS

| | | | |
|---|---|---|---|
| 9,676,325 B1* | 6/2017 | Duan | B60Q 9/00 |
| 2006/0082437 A1 | 4/2006 | Yuhara | |
| 2008/0122597 A1* | 5/2008 | Englander | B60Q 1/24 |
| | | | 340/433 |
| 2009/0287367 A1 | 11/2009 | Salinger | |
| 2011/0137520 A1 | 6/2011 | Rector et al. | |
| 2012/0157052 A1 | 6/2012 | Quade | |
| 2015/0363986 A1* | 12/2015 | Hoyos | G07C 9/00563 |
| | | | 340/5.61 |
| 2016/0300410 A1* | 10/2016 | Jones | G06K 9/00288 |
| 2016/0301698 A1 | 10/2016 | Katara et al. | |
| 2016/0342943 A1* | 11/2016 | Wiechers | G06Q 10/0833 |
| 2016/0350567 A1* | 12/2016 | McQuade | G08G 1/20 |

* cited by examiner

DESTINATION CRITERIA FOR UNLOCKING A VEHICLE DOOR

FIELD

The subject matter disclosed herein relates to vehicle egress control and more particularly relates to unlocking a vehicle door in response to the vehicle satisfying one or more destination criteria.

BACKGROUND

As self-driving cars become more popular, people who currently are not allowed to drive will have a more freedom to get around. However, certain types of people who aren't currently allowed to drive will still need supervision when using self-driving cars until they arrive at their destinations.

BRIEF SUMMARY

An apparatus for controlling vehicle egress is disclosed. A method and computer program product also perform the functions of the apparatus.

One apparatus for controlling vehicle egress includes a vehicle, a processor, a memory that stores code executable by the processor. The processor determines whether a supervised passenger is in the vehicle, locks a vehicle door in response to a supervised passenger being in the vehicle, and unlocks the vehicle door in response to the vehicle satisfying one or more predetermined destination criteria. The predetermined destination criteria include reaching a predetermined location and/or detecting a guardian of the supervised passenger in proximity to the vehicle.

In some embodiments, an apparatus for controlling vehicle egress includes a camera. In one such embodiment, unlocking the vehicle door in response to the vehicle detecting a guardian of the supervised passenger in proximity to the vehicle includes the processor analyzing image data from the camera to detect a guardian of the supervised passenger in proximity to the vehicle, and unlocking the vehicle door in response to the guardian being within a predetermined distance of the vehicle door. In another such embodiment, unlocking the vehicle door in response to the vehicle detecting a guardian of the supervised passenger in proximity to the vehicle includes the processor analyzing image data from the camera to detect an individual in proximity to the vehicle, determining whether the individual is an authorized guardian of the supervised passenger, and unlocking the vehicle door in response to the individual being an authorized guardian of the supervised passenger.

In certain embodiments, determining whether the individual is an authorized guardian of the supervised passenger includes the processor: determining whether the individual near the vehicle is within a predetermined distance of the vehicle, performing facial recognition of the individual near the vehicle in response to the individual being within the predetermined distance, accessing a database of authorized guardians for the supervised passenger, comparing facial recognition results to entries in the database of authorized guardians, and determining whether the individual is an authorized guardian based on the comparison. An apparatus for controlling vehicle egress may also include a receiver that receives a key from the individual. In such embodiments, determining whether the individual is an authorized guardian of the supervised passenger includes the processor validating the received key. In one embodiment, the key is a transmission from an RFID tag. In another embodiment, the key is a security token received from an electronic device of the individual.

In certain embodiments, an apparatus for controlling vehicle egress includes a clock. In such embodiments, unlocking the vehicle door in response to the vehicle satisfying one or more predetermined destination criteria further includes the processor unlocking the vehicle door only when a predetermined time criterion is satisfied. In some embodiments, the supervised passenger is an unaccompanied minor.

One method for controlling vehicle egress includes: determining, using a processor, whether a supervised passenger is in a vehicle, locking a vehicle door in response to a supervised passenger being in the vehicle, and unlocking the vehicle door in response to the vehicle satisfying one or more predetermined destination criteria, the one or more predetermined criteria including one or more of: reaching a predetermined location and detecting a guardian of the supervised passenger in proximity to the vehicle.

In some embodiments, a method for controlling vehicle egress includes receiving image data from a camera coupled to the vehicle, and analyzing the image data to detect a guardian of the supervised passenger in proximity the vehicle. In such embodiments, unlocking the vehicle door in response to the vehicle detecting a guardian of the supervised passenger in proximity to the vehicle may include unlocking the vehicle door in response to the guardian being within a predetermined distance of the vehicle door.

In certain embodiments, a method for controlling vehicle egress includes analyzing the image data to detect an individual in proximity to the vehicle and determining whether the individual is an authorized guardian of the supervised passenger. In such embodiments, unlocking the vehicle door in response to the vehicle detecting a guardian of the supervised passenger in proximity to the vehicle includes unlocking the vehicle door in response to the individual being an authorized guardian of the supervised passenger.

In certain embodiments, determining whether the individual is an authorized guardian of the supervised passenger includes determining whether the individual near the vehicle is within a predetermined distance of the vehicle, performing facial recognition of the individual near the vehicle in response to the individual being within the predetermined distance, accessing a database of authorized guardians for the supervised passenger, comparing facial recognition results to entries in the database of authorized guardians, and determining whether the individual is an authorized guardian based on the comparison. In such embodiments, determining whether the individual is an authorized guardian of the supervised passenger includes validating a key received from the individual. In one embodiment, the key is a security token received from an electronic device of the individual. In another embodiment, the key is a transmission from an RFID tag.

In further embodiments, unlocking the vehicle door in response to the vehicle satisfying one or more predetermined destination criteria includes unlocking the vehicle door only at a predetermined time.

One program product for controlling vehicle egress includes a computer readable storage medium that stores code executable by a processor, the executable code including code to perform: determining whether a supervised passenger is in a vehicle, locking a vehicle door in response to a supervised passenger being in the vehicle, and unlocking the vehicle door in response to the vehicle satisfying one or more predetermined destination criteria, the predetermined destination criteria including one or more of: reaching a predetermined location and detecting a guardian of the supervised passenger in proximity to the vehicle.

In some embodiments, a program product for controlling vehicle egress includes code that receives image data from a camera coupled to the vehicle, and analyzing the image data to detect a guardian near the vehicle. In such embodiments, unlocking the vehicle door in response to the vehicle detecting a guardian of the supervised passenger in proximity to the vehicle includes unlocking the vehicle door in response to the guardian being within a predetermined distance of the vehicle door.

In certain embodiments, a program product for controlling vehicle egress includes code that analyzes the image data to detect an individual near the vehicle and determining whether the individual is an authorized guardian of the supervised passenger. In such embodiments, unlocking the vehicle door in response to the vehicle detecting a guardian of the supervised passenger in proximity to the vehicle includes unlocking the vehicle door in response to the individual being an authorized guardian of the supervised passenger.

In certain embodiments, determining whether the individual is an authorized guardian of the supervised passenger includes validating a key received from the individual. In further embodiments, unlocking the vehicle door in response to the vehicle satisfying one or more predetermined destination criteria further includes unlocking the vehicle door only at a predetermined time.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine-readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The present disclosure describes systems, apparatus, and method for controlling vehicle egress. Generally, certain types of passengers should be supervised to prevent their egress from a vehicle at inappropriate times. These passengers are not permitted to exit the vehicle at will. In one example, these passengers include anyone who cannot judge when it is appropriate to exit the vehicle. Such a passenger may be, for example, a child, a person with a cognitive disability, or any individual with an illness or condition affecting their ability to judge when it is appropriate to exit a vehicle. As another example, such a passenger may be a prisoner, a convict, a detainee, or any individual not at liberty to egress from the vehicle at will. Throughout this disclosure, an individual requiring supervision (e.g., requiring egress control) is referred to as a "supervised passenger."

In order to control vehicle egress, the present disclosure describes systems, apparatus, and methods that determine whether a supervised passenger is in a vehicle, lock a vehicle door in response to a supervised passenger in the vehicle, and unlock the vehicle door in response to the vehicle meeting predetermined destination criteria. The predetermined destination criteria may include one or more of reaching a predetermined location, detecting the presence of a guardian of the supervised passenger, meeting a time requirement, and the like.

Figure 1:
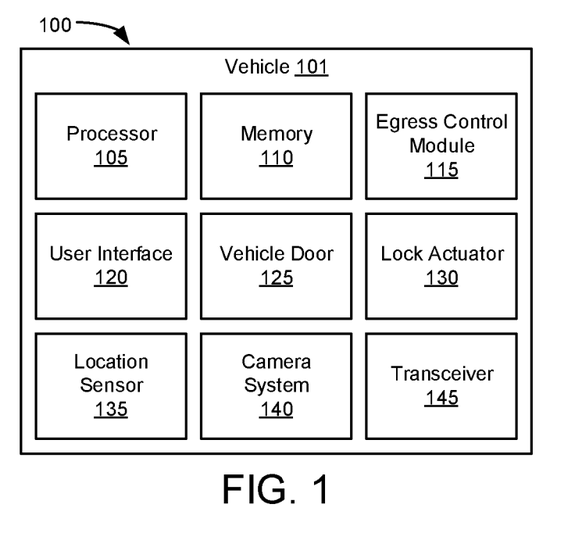
FIG. 1 is a schematic block diagram illustrating one embodiment of a system for controlling vehicle egress.

FIG. 1 is a schematic block diagram illustrating a system 100 for controlling vehicle egress, according to embodiments of the disclosure. The system 100 includes a vehicle 101 capable of transporting a supervised passenger from a starting point to a destination location. In the depicted embodiment, the vehicle 101 includes a processor 105, a memory 110, an egress control module 115, a user interface 120, a vehicle door 125, and a lock actuator 130. In certain embodiments, the vehicle 101 may also include one or more of a location sensor 135, a camera system 140, and a transceiver 145.

In some embodiments, the vehicle 101 is an automobile. In certain embodiments, the vehicle 101 is a self-driving automobile, that is a (computer-controlled) vehicle capable of navigating from a starting point to a destination without a driver. In other embodiments, the vehicle 101 may be a conventional (e.g., non-self-driving) automobile.

The processor 105, in one embodiment, may comprise any known controller capable of executing computer-readable instructions and/or capable of performing logical operations. For example, the processor 105 may be a microcontroller, a microprocessor, a central processing unit (CPU), a graphics processing unit (GPU), an auxiliary processing unit, a FPGA, an integrated circuit, or similar controller. In certain embodiments, the processor 105 may include multiple processing units, such as multiple processing cores, multiple CPUs, multiple microcontrollers, or the like. In some embodiments, the processor 105 executes instructions stored in the memory 110 to perform the methods and routines described herein. The processor 105 is communicatively coupled to the memory 110, the egress control module 115, the user interface 120, the lock actuator 130, the location sensor 135, the camera system 140, and/or the transceiver 145. Additionally, the processor 105 may be communicatively coupled to one or more vehicle sensors, vehicle controllers, and/or driving mechanisms (e.g., an accelerator, a brake controller, a steering controller, etc.) Accordingly, the processor 105 may control the vehicle 101 to achieve self-driving actions.

The memory 110, in one embodiment, is a computer readable storage medium. In some embodiments, the memory 110 includes volatile computer storage media. For example, the memory 110 may include a random access memory (RAM), including dynamic RAM (DRAM), synchronous dynamic RAM (SDRAM), and/or static RAM (SRAM). In some embodiments, the memory 110 includes non-volatile computer storage media. For example, the memory 110 may include a hard disk drive, a flash memory, or any other suitable non-volatile computer storage device. In some embodiments, the memory 110 includes both volatile and non-volatile computer storage media.

In some embodiments, the memory 110 stores data relating to controlling vehicle egress. For example, the memory 110 may store destination criteria, vehicle location data, image data, and the like. In some embodiments, the memory 110 also stores executable code and related data, such as an operating system, navigation system, infotainment system, or controller algorithms operating on the vehicle 101.

The egress control module 115, in one embodiment, determines whether supervised passenger is in the vehicle, locks a vehicle door in response to a supervised passenger being in the vehicle, and unlocks the vehicle door in response to legal meaning predetermined destination criteria. As mentioned above, the predetermined destination criteria may include one or more of: reaching a predetermined location and detecting a guardian of the supervised passenger in proximity to the vehicle. Additionally, the predetermined destination criteria may include a time parameter. In certain embodiments, the egress control module 115 analyzes image data from the camera system 140 detect the presence of a guardian of the supervised passenger in proximity to the vehicle. In other embodiments, the egress control module 115 detects the presence of the supervised passenger's guardian by receiving a key via the transceiver 145.

Embodiments of the egress control module 115 are described in further detail below. In some embodiments, the egress control module 115 may be implemented as a hardware circuit (e.g., a controller, a custom VLSI circuit or gate array, a logic chip, integrated circuit, or the like), a programmable logic device (e.g., a field programmable gate array, a programmable array logic, programmable logic devices, or the like), executable code (e.g., software, firmware, device driver, or the like), or combinations thereof.

In certain embodiments, the egress control module 115 is a separate unit from the rest of the vehicle 101, such as a removable unit. For example, the egress control module 115 may be a physical unit that plugs into the vehicle 101, for example into a computer bus at the vehicle 101. Thus, the egress control module 115 may be added to a vehicle 101 in order to realize egress control at the vehicle 101. Where the egress control module 115 is a separate unit, the unit may include one or more of a location sensor 135, camera system 140, and/or transceiver 145 performing the egress control functions described herein.

The user interface 120 facilitates interaction between the user and the vehicle 101. Generally, the user interface 120 includes a graphical user interface (GUI) using graphical icons and other visual indicators. Further, the user interface 120 may include both an input portion and an output portion.

The input portion of the user interface 120, in one embodiment, may include any known computer input device including a touch panel, a button, a keyboard, a stylus, a microphone, or the like. In some embodiments, the input portion may be integrated with the output portion, for example, as a touchscreen or similar touch-sensitive display. In some embodiments, the user interface 120 includes two or more different input devices, such as a touch panel and one or more additional buttons/keys.

The output portion of the user interface 120, in one embodiment, may include any known electronically controllable display or display device. The output portion of the user interface 120 may be designed to output visual, audible, and/or haptic signals. In some embodiments, the user interface 120 includes an electronic display capable of outputting visual data to a user, including, but is not limited to, an LCD display, an LED display, an OLED display, a projector, or similar display device capable of outputting images, text, or the like to a user. As another, non-limiting example, the output portion of the user interface 120 may include a wearable display such as a smart watch, smart glasses, a heads-up display, or the like. Further, the output portion of the user interface 120 may include a component of a smart phone, a personal digital assistant, a television, a table computer, a notebook (laptop) computer, a personal computer, a vehicle dashboard, or the like.

In certain embodiments, the output portion of the user interface 120 includes one or more speakers for producing sound. For example, the output portion of the user interface 120 may produce an audible alert or notification (e.g., a beep or chime). In some embodiments, the output portion of the user interface 120 includes one or more haptic devices for producing vibrations, motion, or other haptic feedback. In some embodiments, at least a portion of the input portion of the user interface 120 and/or output portion of the user interface 120 may be a headphone, headset, handset, earphone, earpiece, eyepiece, or similar device located remotely and/or separable from the rest of user interface 120.

The vehicle door 125

The lock actuator 130

The location sensor 135 comprise any suitable device for identifying a current location of the vehicle 101. Examples of location sensors include satellite navigation receivers (e.g., GPS received), gyroscopes, accelerometers, barometers, altimeters, and the like. In certain embodiments, the location sensor 135 may be a part of a navigation system used by the vehicle 101. Where the egress control module 115 is a separate unit, at least one location sensor 135 may be included in said separate unit.

The camera system 140 may comprise any suitable device(s) for capturing image data of persons and/or objects inside or outside the vehicle 101 in certain embodiments, the camera system 140 includes multiple cameras for capturing images at multiple angles or points-of-view. The cameras of the camera system 140 may be mounted inside and/or outside the car. Where the egress control module 115 is a separate unit, at least one camera of the camera system 140 may be mounted on said separate unit. In certain embodiments, the camera system 140 may include a camera that is may be separate from, but communicatively coupled to the vehicle 101. For example, a camera the smart phone may be communicatively coupled to the camera system 140, wherein the camera system 140 receives image data captured by the smart phone camera.

The camera system 140 may be used to determine whether one or more destination criteria are satisfied, and thus trigger unlocking the locked doors. In some embodiments, the image data from the camera system 140 is analyzed to determine whether there is a guardian near the vehicle. For example, the camera system 140 may be used to recognize the guardian among one or more individuals near the vehicle. As another example, the camera system 140 may be used to identify whether an individual is within predetermined distance of a vehicle door 125. Image data from the camera system 140 may be used at allies to detect and recognize faces and/or uniforms of authorized guardians. For example, the image data may be used to identify uniforms where an individual wearing a specific employee uniform (e.g., hospital employees, medical personnel, school employees, or law enforcement) is considered a guardian. Additionally, the camera system 140 may be used to detect an emergency condition within the vehicle.

The transceiver 145 may include communication hardware and/or software for receiving a digital key from a guardian. The digital key may be received via RFID tag, radio beacon, radio signal, SMS message, short-range wireless transmission, or the like. The digital key may be a predefined message (such as a prearranged word or phrase), a security token, an image, a QR ("Quick Response") code, barcode or another symbol, or the like. Receiving the digital key from the guardian may include after a handshake or other authorization protocol. The transceiver 145 may include any number of transmitters and receivers suitable for receiving a digital key. The transceiver 145 may utilize one or more wireless communication media and/or wireless communication bands suitable for receiving the digital key.

The vehicle 101 controls egress of the supervised passenger by only allowing the vehicle doors to unlock for specific people (e.g., guardians) when specific riders (e.g., minors or adults who should exit alone, referred to as "supervised passengers") are in the vehicle 101. The vehicle 101 allows egress when predetermined destination criteria are satisfied. The predetermined destination criteria may include location-based restrictions, user-based restrictions, time restrictions, and the like.

As a first example, a child may be sent to sports practice, wherein the vehicle doors 125 will unlock once a specific GPS location is reached (e.g., corresponding to the sports practice facility). In some scenarios, the vehicle doors only unlock when a coach (an authorized guardian of the supervised passenger) is near the vehicle 101. In further scenarios, the vehicle doors will only unlock to the coach during certain periods of time. Here, the coach may have a digital key used to identify that the coach is an authorized guardian, where the key only works during the sports practice hours.

As a second example, an elderly adult may be sent from a care facility to a medical center, wherein the vehicle doors 125 will unlock when the vehicle 101 reaches the street address of the medical center. Additionally, the vehicle doors may only unlock when staff of the medical center are near the vehicle doors 125. The staff of the medical center may be identifiable by uniform, nametags, faces, or digital key, as discussed further herein.

As a third example, a detainee may be sent from a detention facility to a medical center, wherein the vehicle doors 125 will unlock when the vehicle 101 reaches the medical center. Here, a vehicle door 125 may only unlock when a law enforcement individual is near the vehicle door 125. Again, the law enforcement individual may be identifiable by uniform, nametags, face, or digital key.

Figure 2:
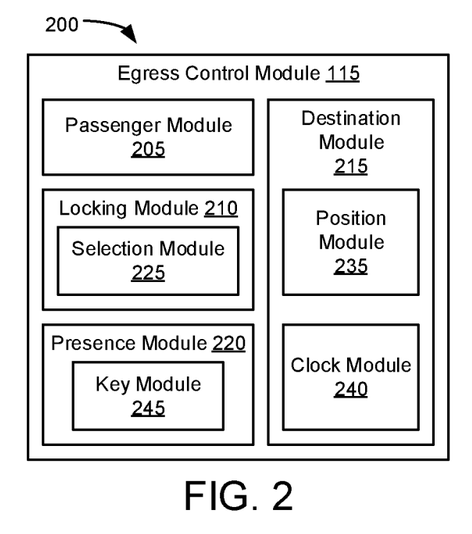
FIG. 2 is a schematic block diagram illustrating one embodiment of an apparatus for controlling vehicle egress.

FIG. 2 is a schematic block diagram illustrating an apparatus 200 for controlling vehicle egress, according to embodiments of the disclosure. The apparatus 200 includes an egress control module 115, which may be one embodiment of the egress control module 115 described above with reference to FIG. 1. The egress control module 115 includes a passenger module 205, a locking module 210, and a destination module 215. As depicted, the egress control module 115 may also include a presence module 220. Additionally, the passenger module 205 may include one or more submodules such as a selection module 225, a position module 230, a clock module 235, and a key module 240. The modules 205-240 may be communicatively coupled to one another. The egress control module 115 may comprise hardware circuits, executable code operating on a processing device, or a combination of hardware circuitry and executable code.

The passenger module 205, in one embodiment, determines whether a supervised passenger is in the vehicle. As discussed above, a supervised passenger is a passenger requiring supervision so as to prevent untimely egress from the vehicle. In some embodiments, a passenger requiring supervision to prevent untimely egress from a vehicle is only considered a "supervised passenger" when said passenger is unaccompanied by a person who does not require supervision to prevent untimely egress. Thus, a minor child would be considered a "supervised passenger" when traveling alone in a self-driving vehicle, however, the same minor child would not be considered a "supervised passenger" when accompanied by an adult in the same self-driving vehicle.

In certain embodiments, the passenger module 205 receives input from a person supervising a supervised passenger (referred to as a "supervisor") indicating the presence of the supervised passenger in the vehicle. In other embodiments, the passenger module 205 automatically detects the presence of a supervised passenger within the vehicle. For example, a supervised passenger may be identifiable by a RFID tag or bracelet, by a mobile device associated with the supervised passenger, by voiceprint, fingerprint, retina pattern, or other biometric identifier, by a face recognition, and the like.

In one embodiment, the passenger module 205 recognizes the supervised passenger in response to the supervised passenger and/or the supervisor actuating a control within the vehicle 101. For example, the supervised passenger and/or the supervisor may press a dedicated button or the like. In another embodiment, the passenger module 205 provisionally recognizes that a supervised passenger is in the vehicle 101 in response to detecting a person being present in certain seats or in response to a seated person having less than a threshold size and/or weight. Still further, the passenger module 205 may determine whether the person is a supervised passenger via image recognition, biometric recognition, and the like in response to provisionally recognizing that a supervised passenger is in the vehicle 101.

As discussed above, a criterion for determining whether a passenger is a supervised passenger may be whether said passenger is unaccompanied by an adult or the responsible party. Thus, the passenger module 205 may wait until all doors are shut and the vehicle 101 is ready to travel before automatically determining whether a supervised passenger is in the vehicle. In some embodiments, the passenger module 205 automatically determines whether any passenger in the vehicle is a supervised passenger in response to the passenger entering the vehicle 101. The passenger module 205 may comprise hardware circuits, executable code operating on a processing device, or a combination of hardware circuitry and executable code.

The locking module 210, in one embodiment, locks a vehicle door 125 in response to a supervised passenger being in the vehicle 101. As used herein, the locking module 210 "locking" a vehicle door 125 refers to the locking module 210 controlling the lock actuator 130 to lock the vehicle door 125. Generally, the egress control module 115 concerned with locking the vehicle door 125 to the inside to prevent untimely egress. In certain embodiments, the same vehicle door 125 may be also locked to the outside (e.g., preventing an individual outside the vehicle from opening the vehicle door 125).

In situations where the supervised passenger is traveling alone in a vehicle (e.g., alone in a self-driving vehicle), the locking module 210 locks all the vehicle doors accessible by the supervised passenger (e.g., controls the lock actuator 130 to lock the vehicle doors). In situations where the supervised passenger is not traveling alone, the locking module 210 may identify a vehicle door nearest the supervised passenger and lock that door to prevent untimely egress. Alternatively, the locking module 210 may identify a passenger section in which the supervised passengers located and lock all doors in the identified passenger section. As an example, if a supervised passenger is seated by themselves in a rear seat/bench of the vehicle, then the locking module 210 may lock all doors accessible from the rear seat/bench (e.g., the rear passenger doors) even if there is an adult and the driver or front passenger seat.

In some embodiments, locking occurs once all vehicle doors 125 are shut and the vehicle is prepared to move. Locking may occur immediately before the vehicle 101 begins to move and the trip begins. The locking module 210 may comprise hardware circuits, executable code operating on a processing device, or a combination of hardware circuitry and executable code.

In some embodiments, the locking module 210 includes a selection module 225. The selection module 225, in one embodiment, may select one or more vehicle doors 125 corresponding to the supervised passenger's location with the vehicle to control egress by a supervised passenger. The selection module 225 may analyze image data, seat sensor data, and the like to determine a location of the supervised passenger. For example, the selection module 225 may receive image data from a camera system 140 having a view of the interior (e.g., passenger sections) of the vehicle 101. Alternatively, the selection module 225 may receive an in-vehicle location of the supervised passenger, for example from the passenger module 205, and determine which vehicle doors 125 to lock based on the in-vehicle location.

Where the supervised passenger changes seats during the trip, the selection module 225 may determine whether additional vehicle doors 125 are to be locked to prevent untimely egress by the supervised passenger. The selection module 225 may comprise hardware circuits, executable code operating on a processing device, or a combination of hardware circuitry and executable code. While described as a part of the locking module 210, in certain embodiments the selection module 225 may be a separate component of the egress control module 115 in communication with the locking module 210.

The destination module 215, in one embodiment, unlocks the vehicle door(s) 125 in response to the vehicle 101 satisfying one or more predetermined destination criteria. The one or more predetermined destination criteria may include reaching a predetermined location and/or detecting a guardian of the supervised passenger in proximity to the vehicle. Additional destination criteria may include, but not limited to, requiring the vehicle to be stopped before permitting egress, requiring a vehicle engine to be off or a transmission disengaged before permitting egress, permitting egress only after a certain time, and the like. When all predetermined criteria are satisfied, the destination module 215 controls the lock actuator 130 to unlock the egress-controlled vehicle door(s) 125 to permit the supervised passenger to egress the vehicle.

The destination criteria are predetermined, meaning that it is set prior to the vehicle 101 beginning its trip with the unsupervised passenger. The destination criteria may be entered by a parent, legal guardian, or other adult in charge of the supervised passenger (e.g., by a supervisor). In some embodiments, the destination criteria are entered using an in-vehicle navigation system or infotainment system. In other embodiments, the destination criteria are transmitted to the vehicle 101. In one embodiment, the destination criteria may be entered into a webpage, wherein a server transmits the destination criteria to the egress control module 115. In another embodiment, the destination criteria may be entered using a mobile application located on a mobile device and communicated wirelessly to the egress control module 115. For example, the transceiver 145 may receive one or more data packets containing the destination criteria which are then passed to the egress control module 115.

In some embodiments, the destination criteria may be stored long-term in the vehicle 101 and/or egress control module 115. For example, a parent or legal guardian of the supervised passenger may select pre-stored destination criteria. As another example, a parent or legal guardian may access a history of entered destination criteria and select destination criteria from the stored history. This may be particularly useful when the supervised passenger is regularly transported to a location for a recurring event, such as traveling to school, to sports practice, to a friend's house, to a medical center, etc. In certain embodiments, the destination module 215 may access a calendar of the supervised passenger and/or of the parent, legal guardian, or supervisor of the supervised passenger, in order to identify one or more predetermined criteria, such as a location requirement, a time requirement, and the like.

While the one or more destination criteria are predetermined prior to the vehicle 101 embarking on the supervised passenger's trip, in certain embodiments the destination criteria may be modified during the trip (e.g., while the vehicle is traveling to its destination). For example, a child may be traveling alone a self-driving car to an appointment in the child's parent may learn the deployment has been canceled. In such a situation, the predetermined destination location (e.g., location requirement) may be modified to new location such as the child's home, or any other suitable location. Thus, the parent, legal guardian, or supervisor may access the destination criteria after the trip is begun to modify the destination criteria.

Still further, the destination module 215 may be overridden when an emergency condition is detected. The emergency condition may relate to the state and/or health of the vehicle 101, the supervised passenger, another passenger in the vehicle 101. In response to detecting the emergency condition, the egress control module 115 may override the predetermined destination criteria in order to permit egress from the vehicle 101. In certain embodiments, the egress control module 115 may analyze image data from the camera system 140 to detect the emergency condition. In other embodiments, a passenger may indicate an emergency condition (e.g., by voice command, by pressing a panic button, etc.) and the egress control module 115 permits egress from the vehicle upon verifying the emergency condition.

As discussed above, the predetermined destination criteria may include a predetermined destination location. The location (e.g., a destination) may be a set of coordinates, a street address, and the like. Additionally, the location may encompass an area surrounding a specified position, such that the vehicle 101 satisfies the location requirement once it enters the area surrounding the specified position. The destination module 215 may use the position module 230 to determine whether a location requirement is satisfied.

The predetermined destination criteria may include detecting a guardian of the supervised passenger in proximity to the vehicle. For example, when a child travels by herself to sports practice, the destination criteria may require that the child's coach or trainer be in proximity to the vehicle before allowing the child to egress. As another example, a child may travel alone to school in a self-driving car, wherein a school employee to be recognized as the guardian satisfying the destination criteria. The school employee may be recognized using voice or facial recognition, by recognizing a uniform belonging to the school, or other suitable methods. The destination module 215 may trigger the unlocking of the vehicle doors 125 in response to the guardian being within a predetermined distance of the vehicle 101. The destination module 215 and the presence module 220 may cooperatively determine whether the guardian requirement is satisfied.

In some embodiments, the destination criteria may include time requirement, such as a time window during which egress is permitted, a time window during which egress is not permitted, a time after which egress is permitted, a time before which egress is permitted, and the like. In certain embodiments, the destination module 215 may modify the time requirement of the vehicle 101 is unable to reach the predetermined location within a time window for permitting egress, for example due to traffic, due to user input error (e.g., typo), and the like. The destination module 215 may use the clock module 235 to determine whether the time requirement is satisfied. The destination module 215 may comprise hardware circuits, executable code operating on a processing device, or a combination of hardware circuitry and executable code.

In some embodiments, the destination module 215 includes a position module 230. The position module 230, in one embodiment, uses position data from the location sensor 135 to determine whether a location requirement is satisfied. In one embodiment, the position module 230 identifies a location requirement from the destination criteria and monitors the position of the vehicle 101. In certain embodiments, the position module 230 may translate a place name, street address, etc. into a set of coordinates for comparing to the vehicle's current position to determine whether the location requirement is met.

The position module 230 may set a flag in memory 110 indicating whether the location requirement is satisfied. Alternatively, the position module 230 may signal the destination module 215. The position module 230 may send a positive indication to the destination module 215 whenever the location requirement is satisfied. In certain embodiments, the position module 230 may send a negative indication to the destination module 215 whenever the location requirement is not satisfied.

The position module 230 may comprise hardware circuits, executable code operating on a processing device, or a combination of hardware circuitry and executable code. While described as a part of the destination module 215, in certain embodiments the position module 230 may be a separate component of the egress control module 115 in communication with the destination module 215.

In some embodiments, the destination module 215 includes a clock module 235. The clock module 235, in one embodiment, monitors a clock to determine whether a time requirement is met. In one embodiment, the clock module 235 determines whether the destination criteria include a time requirement. If so, the clock module 235 may identify the particular time requirement from the destination criteria.

The clock module 235 may set a flag in memory 110 indicating whether the time requirement is satisfied. Alternatively, the clock module 235 may signal the destination module 215. The clock module 235 may send a positive indication to the destination module 215 whenever the time requirement is satisfied. In certain embodiments, the clock module 235 may send a negative indication to the destination module 215 whenever the time requirement is not satisfied.

The clock module 235 may comprise hardware circuits, executable code operating on a processing device, or a combination of hardware circuitry and executable code. While described as a part of the destination module 215, in certain embodiments the clock module 235 may be a separate component of the egress control module 115 in communication with the destination module 215.

The presence module 220, in one embodiment, determines whether a guardian of the supervised passenger is present near the vehicle. The presence module 220 receives image data from the camera system 140 and/or data transmissions from the transceiver 145 in order to determine the presence of a guardian of the supervised passenger. The presence module 220 then analyzes the received data and determines whether the guardian is present. As used herein a guardian of the supervised passenger refers to an individual into whose care the supervised passenger is entrusted at the destination. The guardian of the supervised passenger is not to be confused with the passenger's legal guardian, although a legal guardian may also be the guardian of the supervised passenger. However, the guardian of the supervised passenger may also be a parent or other adult relative, a teacher, a coach, a trainer, a doctor, and the like. When the predetermined destination criteria include a guardian requirement, the guardian of the supervised passenger must be present at the destination and in proximity to the vehicle before egress from the vehicle is permitted.

In some embodiments, the presence module 220 accesses image data from a camera and performs a facial recognition process on the image data to determine whether a predetermined guardian is present. The guardian may be identified by comparing faces in the image data to one or more images of the guardian stored in the memory 110 or in an external database. In other embodiments, the presence module 220 analyzes image data to determine whether a person wearing a particular uniform is present. For example, the guardian requirement may be satisfied by an employee of a named organization being present, the employee being identified by his or her uniform. In certain embodiments, the image data may be from a camera separate from, but communicatively coupled to the vehicle 101, such as a camera in a mobile device used by the supervised passenger or the guardian.

Generally, the presence module 220 works in tandem with the destination module 215 to determine whether the guardian is present and in proximity to the vehicle. In one embodiment, the presence module 220 determines whether the guardian is present (e.g., identifying the guardian from among one or more individuals near the vehicle) while the destination module 215 determines whether the guardian is near enough to the vehicle to allow egress by the supervised passenger. The presence module 220 may comprise hardware circuits, executable code operating on a processing device, or a combination of hardware circuitry and executable code. While depicted as a separate component of the egress control module 115, in certain embodiments the presence module 220 may be a component (e.g., sub-module) of the destination module 215.

In some embodiments, the presence module 220 includes a key module 240. The key module 240, in one embodiment, receives a digital key from an individual identifying his- or herself as the guardian of the supervised passenger. In some embodiments, the digital key may be received via RFID tag, radio beacon, radio signal, Bluetooth™ or similar short-range wireless transmission protocol. The digital key may be a predefined message (such as a prearranged word or phrase), a security token, a QR ("Quick Response") code, barcode or another symbol, and the like. In certain embodiments, the guardian uses a mobile device to send the digital key, for example via SMS message. The guardian's presence near the vehicle may be established when the digital key is received.

The key module 240 may monitor transmissions received by the transceiver 145 to determine whether a digital key is received. The key module 240 may further compare any received digital key to valid digital key to detect the presence of a guardian. In certain embodiments, one or more valid digital keys are included in the destination criteria. In other embodiments, the key module 240 may look up one or more valid digital keys using a guardian name or other identifier included in the destination criteria.

The key module 240 may set a flag in memory 110 indicating whether a valid digital key is received. Alternatively, the key module 240 may signal the presence module 220. The key module 240 may send a positive indication to the presence module 220 whenever a valid digital key is received. In certain embodiments, the key module 240 may send a negative indication to the presence module 220 if a valid digital key is not received. The key module 240 may comprise hardware circuits, executable code operating on a processing device, or a combination of hardware circuitry and executable code. While described as a part of the presence module 220, in certain embodiments the key module 240 may be a separate component of the egress control module 115 in communication with the presence module 220.

Figure 3:
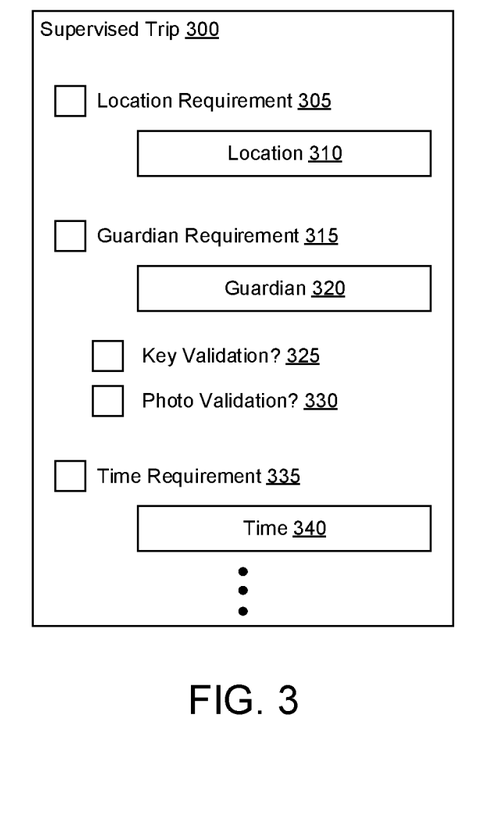
FIG. 3 is a diagram illustrating one embodiment of a supervised trip and corresponding parameters usable for controlling vehicle egress.

FIG. 3 depicts a supervised trip 300 for controlling vehicle egress, according to embodiments of the disclosure. FIG. 3 depicts the supervised trip 300 containing a plurality of parameters defining destination criteria to be used for egress control of a vehicle transporting a supervised passenger. The supervised trip may be received by the egress control module 115 to perform egress control.

In one embodiment, the supervised trip 300 and/or the parameters 305-325 are entered using the user interface 120. In another embodiment, the supervised trip 300 and/or the parameters 305-325 may be entered via a mobile application or webpage and received by the egress control module 115 via the transceiver 145. As discussed above, in certain circumstances the parameters of the supervised trip 300 may be modified after the trip begins. For example, a destination may change, a designated guardian may change, a time requirement maybe added, removed, or modified, and the like.

As depicted, supervised trip 300 contains an option for a location requirement 305 and a corresponding location field 310. The location requirement 305 is a selectable parameter of the supervised trip 300. In one embodiment, a supervisor selects the location requirement 305 and inputs a location into the location field 310. The input location may be a place name, a street address, a set of coordinates, or other suitable location identifier.

Additionally, the location field 310 may be associated with an area surrounding the input location (e.g., an area surrounding the input location out to a 100-foot radius), so that the location requirement 305 is met when the vehicle is within the area. The area may be preset, may be user input, and or may be dynamically determined based on the location in the location field 310. For example, if the location field 310 includes a street address of the school, the egress control module 115 may set the area to include the school building(s), school parking lot, drop-off locations, etc.

Here, the location requirement 305 is depicted as having a "check box" by which a user can choose whether a location requirement must be met to satisfy the destination criteria. However, in other embodiments other suitable selection mechanism may be used. For example, a populated location field 310 may indicate a location requirement, while a blank location field 310 may indicate no location requirement.

As depicted, the supervised trip 300 contains an option for a guardian requirement 315 and a corresponding guardian field 320. The guardian requirement 315 is a selectable parameter of the supervised trip 300. In one embodiment, a supervisor selects the guardian requirement 315 and inputs a guardian identifier into the guardian field 320. The guardian identifier may be a name, a photo/picture, a RFID tag, a security token, or other suitable guardian identifier.

Here, the guardian requirement 315 is depicted as having a "check box" by which a user can choose whether a guardian requirement 315 must be met to satisfy the destination criteria. However, in other embodiments other suitable selection mechanism may be used. For example, a populated guardian field 320 may indicate a guardian requirement, while a blank guardian field 320 may indicate no guardian requirement.

In certain embodiments, the supervised trip 300 may include one or more parameters indicating how the guardian is to be identified. For example, a supervisor may select a key validation option 325 to indicate that the guardian will be identifiable by a key, such as a security token received from the guardian, an RFID tag possessed by the guardian, etc. Here, the guardian field 320 may contain, or point to, a valid key of the guardian. Alternatively, the expected key may be found in a look-up table indexed using an identifier (e.g., name) input into the guardian field 320.

As another example, a supervisor may select a photo validation option 330 to indicate that the guardian is to be identified via camera and facial recognition. Here, the guardian field 320 may contain, or point to, a photo or image of the guardian (e.g., a facial image usable for recognizing the guardian). Alternatively, the guardian's photo/image may be found in a look-up table indexed using an identifier (e.g., name) input into the guardian field 320.

In certain embodiments, the supervised trip 300 contains an option for a time requirement 335 and a corresponding time field 340. The time requirement 335 is a selectable parameter of the supervised trip 300. In one embodiment, the supervisor selects the time requirement 335 and inputs a time into the time field 340. The input time may be a starting time, an ending time, a time range (e.g., time window) during which the vehicle doors may be unlocked (once all other destination criteria are satisfied), a time range during which the vehicle door may not be unlocked (even if all other destination criteria are satisfied), or other suitable time identifier.

Here, the time requirement 335 is depicted as having a "check box" by which a user can choose whether a time requirement 335 must be met to satisfy the destination criteria. However, in other embodiments other suitable selection mechanism may be used. For example, a populated time field 340 may indicate a time requirement 335, while a blank time field 340 may indicate no time requirement 335.

In certain embodiments, the time requirement 335 may be automatically modified after the trip begins (or ignored) in response to unanticipated delays, such as excessive traffic, or in response to a change in the location requirement 305. In other embodiments, the time requirement 335 may be manually adjusted by the supervisor after the trip begins. For example, if a child (a supervised passenger) is sent in a self-driving vehicle to a sports practice and the location of the sports practice is changes after the child's trip begins, the child's parent (e.g., the supervisor) can manually modify the time requirement 335 (e.g., while modifying the location requirement 305) or the egress control module 115 may automatically change the time requirement 335 in response to the changed location. However, in some situations the time requirement 335 may be tied to a particular event (e.g., the sports practice) and will not change to allow the supervised passenger to egress the vehicle before the event begins (e.g., will not unlock the vehicle doors before the sports practice it to begin even if the sports practice location changes).

Figure 4A:
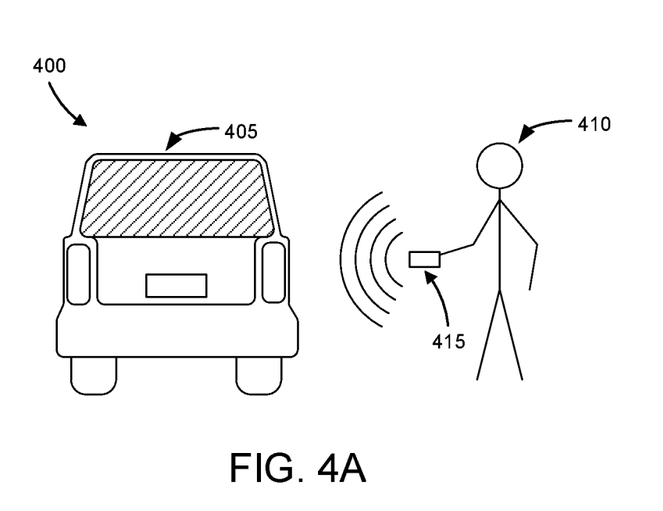
FIG. 4A is a diagram illustrating one embodiment of determining that a guardian of a supervised passenger is in proximity to a vehicle.
Figure 4B:
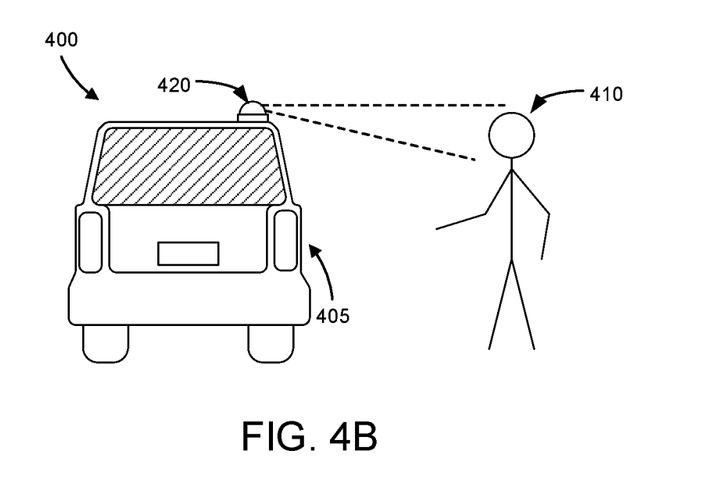
FIG. 4B is a diagram illustrating another embodiment of determining that a guardian of a supervised passenger is in proximity to a vehicle.

FIGS. 4A-4B depict embodiments of an egress control system 400 determining that a guardian of a supervised passenger is in proximity to a vehicle 405. As depicted, the egress control system 400 may include a vehicle 405, which may be one embodiment of the vehicle 101 described above with reference to FIG. 1. As such, the vehicle 405 may include an egress control module 115 and one or more egress-controlled doors 125, as described above with reference to FIGS. 1-2.

FIG. 4A shows an individual 410 near the vehicle 405. Here the individual 410 has a key-sharing device 415 that shares a digital key to the vehicle 405, the digital key authenticating the individual 410 as an authorized guardian of a supervised passenger. In certain embodiments, the key-sharing device 415 may be a short range device, such that the individual 410 must be within a predetermined distance of the vehicle 405 before communicating the digital key. In one embodiment, the digital key may be transmitted by the key-sharing device, either directly or via a wireless communication network (e.g., mobile telecommunication network, local area network, etc.). In another embodiment, the digital key is a symbol or message printed on an object, where and communicate in the digital key includes presenting the printed symbol/message to a camera.

The vehicle 405 receives the digital key and determines whether the individual 410 is an authorized guardian based on the digital key. For example, the vehicle 405 may ask a database of digital keys belonging to authorized guardians and compare the received digital key to those in the database. As another example, the vehicle 405 may consult receive destination criteria, wherein the destination criteria includes a digital key to be received from the authorized guardian. Upon authenticating the individual 410 as on authorized guardian, the vehicle 405 may unlock one or more vehicle doors (assuming other predetermined criteria, such as location and time, are also satisfied) thereby permitting egress by the supervised passenger.

While depicted as an object held in the hand, the key-sharing device 415 may be any device suitable for sending a digital key to the vehicle 405. Examples of a key-sharing device 415 include, but are not limited to, an RFID bracelet, a mobile phone, a card with a predetermined symbol (e.g., QR code, barcode, etc.) or message printed thereon, a photo identification, and the like.

FIG. 4B also shows an individual 410 near the vehicle 405. Here, the vehicle 405 includes a camera 420 that captures image data usable to authenticate the individual 410 as an authorized guardian of a supervised passenger. The camera 420 may capture the image data when the individual 410 is within a predetermined distance of the vehicle 405. Alternatively, the camera 420 may constantly capture image data.

The vehicle 405 analyzes the captured image data to determine whether the individual 410 is an authorized guardian. In one embodiment, the image data includes a face of the individual 410, wherein facial recognition is used to authenticate the individual 410. In another embodiment, the image data includes a uniform worn by the individual 410, wherein image object recognition and/or text recognition is used to authenticate individual 410 based on the uniform.

In certain embodiments, the camera 420 may also capture audio data, wherein the vehicle 405 additionally authenticates a voiceprint of the individual 410 using the audio data. Upon authenticating the individual 410 as on authorized guardian, the vehicle 405 may unlock one or more vehicle doors (assuming other predetermined criteria, such as location and time, are also satisfied) thereby permitting egress by the supervised passenger.

Figure 5:
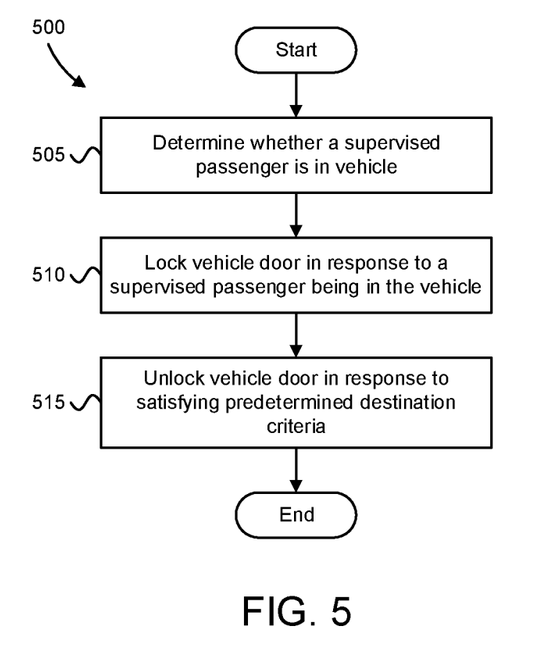
FIG. 5 is a schematic flow chart diagram illustrating one embodiment of a method for controlling vehicle egress.

FIG. 5 is a schematic flow chart diagram illustrating a method 500 for controlling vehicle egress, according to embodiments of the disclosure. In one embodiment, the method 500 is performed by the vehicle 101. In another embodiment, the method 500 may be performed by the apparatus 200. Alternatively, the method 500 may be performed by a processor and a computer readable storage medium, such as the processor 105 and memory 110. The computer readable storage medium may store code that is executed on the processor to perform the functions of the method 500.

The method 500 begins and determines 505 whether a supervised passenger is in a vehicle. In one embodiment, the passenger module 205 determines 505 whether a supervised passenger is in a vehicle. In some embodiments, determining 505 whether a supervised passenger is in a vehicle includes receiving a signal from a user, such as a supervised passenger or a supervisor of the supervised passenger, indicating the presence of the supervised passenger. In other embodiments, determining 505 whether supervised passenger is in the vehicle includes analyzing image data, voice data, and/or other sensor data to recognize the supervised passenger.

The method 500 locks 510 a vehicle door in response to a supervised passenger being in the vehicle. The vehicle door is locked to the inside to prevent egress by the supervised passenger. The vehicle door may also be locked to the outside to prevent an individual outside the vehicle from opening the vehicle door. In one embodiment, the locking module 210 controls the lock actuator 130 to lock 510 at least one vehicle door 125 in response to the supervised passenger being in the vehicle.

In some embodiments, the supervised passenger is unaccompanied in the vehicle and all vehicle doors 125 are locked. In other embodiments, only vehicle doors 125 next to or in the same compartment as the supervised passenger are locked. Locking 510 the vehicle door may occur when the vehicle begins to move, when an engine is started, when the supervised passengers buckled into a safety belt, or the like.

The method 500 unlocks 515 the vehicle door in response to the vehicle meeting predetermined destination criteria. The method 500 ends. A location requirement (e.g., reaching a predetermined location) and the guardian requirement (e.g., detecting a guardian of the supervised passenger in proximity to the vehicle) are examples of predetermined destination criteria that must be met before unlocking 515 the vehicle doors. The predetermined destination criteria may also include a time requirement. In one embodiment, the destination module 215 controls the lock actuator 130 to unlock 515 the vehicle doors 125 locked to the inside to prevent egress by the supervised passenger. In certain embodiments, unlocking 515 the vehicle door includes unlocking the vehicle door to the inside (e.g., allowing the supervised passenger open the vehicle door) while keeping the vehicle door locked to the outside (e.g., preventing a person outside the vehicle from opening the vehicle door).

In one embodiment, unlocking 515 the vehicle door in response to satisfying a guardian requirement may include analyzing image data to detect the presence of an individual near the vehicle a guardian of the supervised passenger and unlocking the vehicle door in response to the guardian being within a predetermined distance of the vehicle door. In another embodiment, unlocking 515 the vehicle door in response to satisfying a guardian choir ment may include detecting the presence of an individual near the vehicle, determining whether the individual is an authorized guardian of the supervised passenger, and unlocking the vehicle door in response to the individual being an authorized guardian.

In certain embodiments, determining whether the individual is an authorized guardian may include performing facial recognition on image data of the individual and comparing facial recognition results to entries in a database of authorized guardians. In other embodiments, determining whether the individual is an authorized guardian may include receiving a key (digital key) from the individual and validating the received key to determine whether the individual is an authorized guardian.

Figure 6:
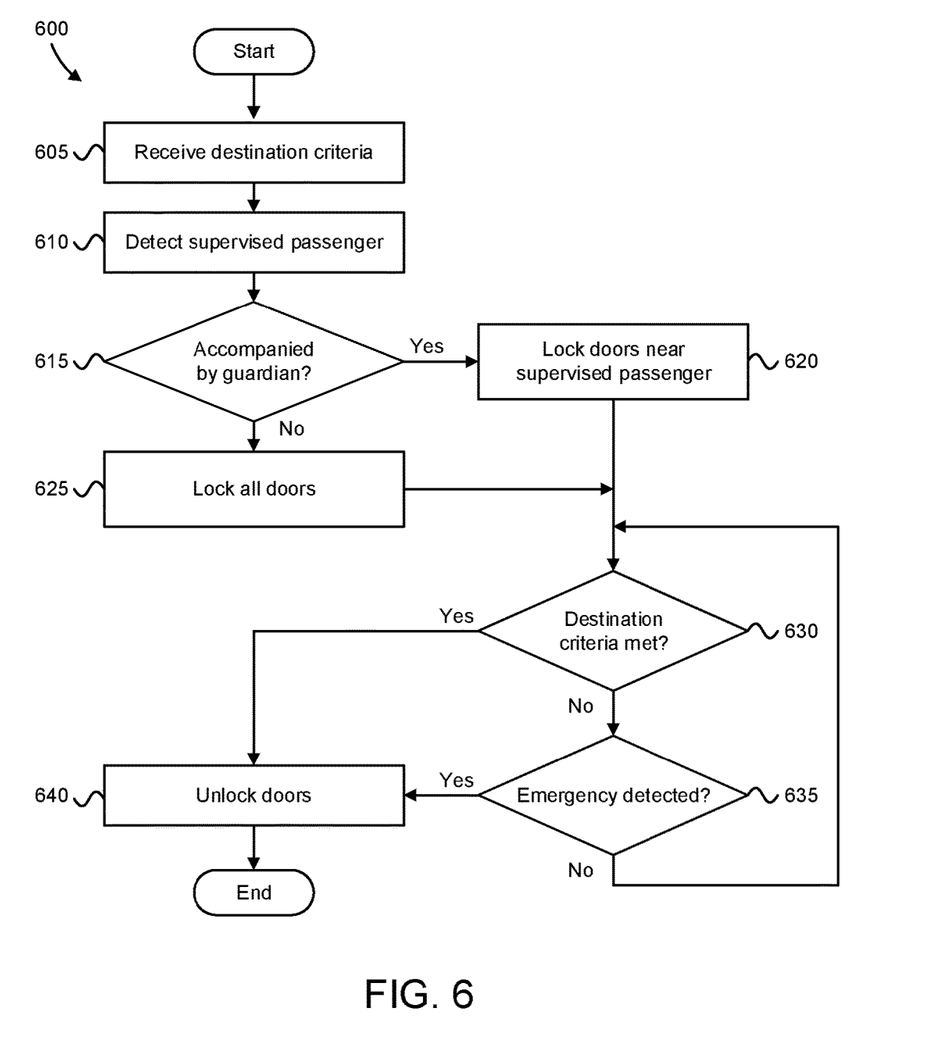
FIG. 6 is a schematic flow chart diagram illustrating another embodiment of a method for controlling vehicle egress.

FIG. 6 is a schematic flow chart diagram illustrating a method 600 for controlling vehicle egress, according to embodiments of the disclosure. In one embodiment, the method 600 is performed by the vehicle 101. In another embodiment, the method 600 may be performed by the apparatus 200. Alternatively, the method 600 may be performed by a processor 105 and a computer readable storage medium, such as the memory 110. The computer readable storage medium may store code that is executed on the processor 105 to perform the functions of the method 600.

The method 600 begins and receives 605 destination criteria. In one embodiment, the egress control module 115 receives 605 the destination criteria. In certain embodiments, receiving 605 the destination criteria via the user interface 120. In other embodiments, the destination criteria may be entered via a mobile application or webpage and received 605 via the transceiver 145.

The method 600 detects 610 the presence of a supervised passenger. In one embodiment, the passenger module 205 detects 610 the presence of the supervised passenger. In some embodiments, detecting 610 the presence of the supervised passenger occurs after receiving the destination criteria and before the vehicle begins to move. In certain embodiments, 610 the presence of the supervised passenger may include monitoring for and receiving a signal from a user, such as a supervised passenger or a supervisor of the supervised passenger, indicating the presence of the supervised passenger. In other embodiments, detecting 610 the presence of the supervised passenger includes analyzing image data, voice data, and/or other sensor data to detect the supervised passenger.

The method 600 determines 615 whether the supervised passenger is accompanied by a guardian. For example, the passenger module 205 may monitor for additional signals from the user indicating that the supervised passengers accompanied by guardian. As another example, the passenger module 205 may analyze image data, voice data, and/or other sensor data to determine 615 whether the supervised passenger is accompanied by a guardian.

If the supervised passenger is accompanied by a guardian, the method 600 locks 620 (e.g., prevents egress from) one or more passenger doors near the supervised passenger, and does not lock a vehicle door near the guardian. For example, if the guardian is a driver of the vehicle, locking 620 one or more passenger doors may include locking all passenger doors and not locking the driver's door. If the supervised passenger is not accompanied by a guardian, the method 600 locks all vehicle doors 625. The vehicle doors are locked to the inside thereby preventing egress by the supervised passenger.

After locking the vehicle door(s), the method 600 determines 630 whether the received destination criteria are satisfied. The destination criteria outline requirements to be satisfied, such as a location requirement, a guardian requirement, and/or a time requirement. Additionally, the destination criteria may require the vehicle to be stopped.

Once all destination criteria are satisfied, the method 600 proceeds to unlock 640 the vehicle doors to the inside, thereby allowing egress by the supervised passenger. However, if any destination criteria are not satisfied, the method 600 determines 635 whether an emergency condition is detected. An emergency condition may be a health crisis of a vehicle passenger, a vehicle failure/breakdown, and the like. If an emergency condition is detected, then the method 600 proceeds to unlock 640 the vehicle doors in order to allow egress. Otherwise, if no emergency condition is detected, the method 600 again determines 630 whether the destination criteria are met. The method 600 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a vehicle having at least one sensor for identifying a passenger in the vehicle;
a processor;
a memory that stores code executable by the processor to:
determine an identity and a location of the passenger using sensor data from the at least one sensor;
determine whether the passenger is a supervised passenger based on the identity of the passenger;
identify whether a vehicle door is accessible by the passenger based on the location of the passenger;
control a lock actuator of the vehicle to lock the vehicle door in response to the passenger being a supervised passenger and in response to the vehicle door being accessible by the supervised passenger; and
control the lock actuator of the vehicle to unlock the vehicle door in response to the vehicle satisfying one or more predetermined destination criteria, the predetermined destination criteria including: the vehicle reaching a predetermined location and detecting a guardian of the supervised passenger in proximity to the vehicle.

2. The apparatus of claim 1, further comprising a camera, wherein controlling the lock actuator of the vehicle to unlock the vehicle door in response to the vehicle detecting a guardian of the supervised passenger in proximity to the vehicle comprises the processor:
analyzing image data from the camera to detect a guardian of the supervised passenger in proximity to the vehicle; and
unlocking the vehicle door in response to the guardian being within a predetermined distance of the vehicle door.

3. The apparatus of claim 1, further comprising a camera, wherein controlling the lock actuator of the vehicle to unlock the vehicle door in response to the vehicle detecting a guardian of the supervised passenger in proximity to the vehicle comprises the processor:
analyzing image data from the camera to detect an individual in proximity to the vehicle;
determining whether the individual is an authorized guardian of the supervised passenger; and
unlocking the vehicle door in response to the individual being an authorized guardian of the supervised passenger.

4. The apparatus of claim 3, wherein determining whether the individual is an authorized guardian of the supervised passenger comprises the processor:
determining whether the individual near the vehicle is within a predetermined distance of the vehicle;
performing facial recognition of the individual near the vehicle in response to the individual being within the predetermined distance;
accessing a database of authorized guardians for the supervised passenger;
comparing facial recognition results to entries in the database of authorized guardians; and
determining whether the individual is an authorized guardian based on the comparison.

5. The apparatus of claim 3, further comprising a receiver that receives a key from the individual, wherein determining whether the individual is an authorized guardian of the supervised passenger comprises the processor validating the received key.

6. The apparatus of claim 5, wherein the key is a transmission from an RFID tag.

7. The apparatus of claim 1, further comprising a clock, wherein controlling the lock actuator of the vehicle to unlock the vehicle door in response to the vehicle satisfying one or more predetermined destination criteria further comprises the processor unlocking the vehicle door only at a predetermined time.

8. The apparatus of claim 1, wherein the supervised passenger is an unaccompanied minor.

9. A method comprising:
detecting, using a processor, a passenger in a vehicle;
identifying an in-vehicle location of the passenger;
determining, using the processor, whether the passenger is a supervised passenger, wherein the determination is based on one of sensor data and user input;
identifying, using the processor, whether a vehicle door is accessible by the passenger based on the in-vehicle location of the passenger;
controlling, using the processor, a lock actuator of the vehicle door to lock the vehicle door in response to the passenger being a supervised passenger and in response to the vehicle door being accessible by the supervised passenger; and
controlling, using the processor, the lock actuator to unlock the vehicle door in response to the vehicle satisfying one or more predetermined destination criteria, the predetermined criteria including: the vehicle reaching a predetermined location and detecting a guardian of the supervised passenger in proximity to the vehicle.

10. The method of claim 9, further comprising:
receiving image data from a camera coupled to the vehicle;
analyzing the image data to detect a guardian of the supervised passenger in proximity the vehicle; and
wherein controlling the lock actuator to unlock the vehicle door in response to the vehicle detecting a guardian of the supervised passenger in proximity to the vehicle comprises the processor controlling the lock actuator to unlock the vehicle door in response to the guardian being within a predetermined distance of the vehicle door.

11. The method of claim 9, further comprising:
receiving image data from a camera coupled to the vehicle;
analyzing the image data to detect an individual in proximity to the vehicle;

determining whether the individual is an authorized guardian of the supervised passenger; and wherein controlling the lock actuator to unlock the vehicle door in response to the vehicle detecting a guardian of the supervised passenger in proximity to the vehicle comprises the processor controlling the lock actuator to unlock the vehicle door in response to the individual being an authorized guardian of the supervised passenger.

12. The method of claim 11, wherein determining whether the individual is an authorized guardian of the supervised passenger comprises:

determining whether the individual near the vehicle is within a predetermined distance of the vehicle;

performing facial recognition of the individual near the vehicle in response to the individual being within the predetermined distance;

accessing a database of authorized guardians for the supervised passenger;

comparing facial recognition results to entries in the database of authorized guardians; and determining whether the individual is an authorized guardian based on the comparison.

13. The method of claim 11, wherein determining whether the individual is an authorized guardian of the supervised passenger comprises validating a key received from the individual.

14. The method of claim 13, wherein the key is a security token received from an electronic device of the individual.

15. The method of claim 9, wherein controlling the lock actuator to unlock the vehicle door in response to the vehicle satisfying one or more predetermined destination criteria comprises the processor controlling the lock actuator to unlock the vehicle door only at a predetermined time.

16. A program product comprising a computer readable storage medium that is not a transitory signal and that stores code executable by a processor, the executable code comprising code to:

determine an identity and an in-the vehicle location of a passenger in a vehicle;

determine whether the passenger is a supervised passenger;

identify a vehicle door accessible by the passenger based on the in-vehicle location of the passenger;

control a lock actuator of the vehicle to lock the vehicle door in response to the passenger being a supervised passenger and in response to the vehicle door being accessible by the supervised passenger; and control the lock actuator of the vehicle to unlock the vehicle door in response to the vehicle satisfying one or more predetermined destination criteria, the predetermined destination criteria including one or more of: the vehicle reaching a predetermined location and detecting a guardian of the supervised passenger in proximity to the vehicle.

17. The program product of claim 16, wherein the executable code further comprises code to perform:

receiving image data from a camera coupled to the vehicle;

analyzing the image data to detect a guardian near the vehicle; and wherein controlling the lock actuator of the vehicle to unlock the vehicle door in response to the vehicle detecting a guardian of the supervised passenger in proximity to the vehicle comprises unlocking the vehicle door in response to the guardian being within a predetermined distance of the vehicle door.

18. The program product of claim 16, wherein the executable code further comprises code to perform:

receiving image data from a camera coupled to the vehicle;

analyzing the image data to detect an individual near the vehicle;

determining whether the individual is an authorized guardian of the supervised passenger; and wherein controlling the lock actuator of the vehicle to unlock the vehicle door in response to the vehicle detecting a guardian of the supervised passenger in proximity to the vehicle comprises unlocking the vehicle door in response to the individual being an authorized guardian of the supervised passenger.

19. The program product of claim 18, wherein determining whether the individual is an authorized guardian of the supervised passenger comprises validating a key received from the individual.

20. The program product of claim 16, wherein unlocking the vehicle door in response to the vehicle satisfying one or more predetermined destination criteria further comprises unlocking the vehicle door only at a predetermined time.

* * * * *